United States Patent [19]
Rutledge

[11] 3,871,086
[45] Mar. 18, 1975

[54] APPARATUS FOR DE-SHELLING CRUSTACEANS

[76] Inventor: James E. Rutledge, 13543 Honey, Baton Rouge, La. 70808

[22] Filed: Sept. 5, 1973

[21] Appl. No.: 394,535

[52] U.S. Cl. .................................. 17/73, 17/48
[51] Int. Cl. .................................. A22c 29/00
[58] Field of Search .............. 17/73, 71, 48, 52

[56] References Cited
UNITED STATES PATENTS

| | | | |
|---|---|---|---|
| 2,702,921 | 3/1955 | Pinney | 17/72 |
| 2,716,776 | 9/1955 | Streich et al. | 17/72 |
| 3,084,379 | 4/1963 | Henning | 17/48 |

Primary Examiner—Richard C. Pinkham
Assistant Examiner—William R. Browne
Attorney, Agent, or Firm—William David Kiesel

[57] ABSTRACT

Apparatus for the peeling of hard shelled crustaceans by passing of de-headed hard shelled crustaceans through parallel cutting blades spaced apart a distance less than the body width of the crustaceans. The spaced apart blades may be composed of assemblies of concentric blades which may be of equal or unequal height.

3 Claims, 8 Drawing Figures

PATENTED MAR 18 1975    3,871,086

APPARATUS FOR DE-SHELLING CRUSTACEANS

BACKGROUND OF THE INVENTION

1. Field of the Invention

This invention relates broadly to butchering, and more specifically, to crustacean peeling means.

2. Prior Art

There has been, over the past 30 years or more, a great deal of research and development in the areas of automating the processing of various thin shelled crustaceans. Apparatus and procedures for de-heading, washing, grading, de-veining and peeling are common in the art, and with regard to certain thin shelled crustaceans, these methods work quite well. For example, U.S. Pat. Nos. 2660754, 3084379, 3110926, 3465383, 3466699 and 3576047 disclose various apparatus and procedures for peeling shrimp that involve either cutting, pinching and squeezing the shells in order to remove the meat therefrom. For thick shell crustaceans, such as crayfish, lobsters, etc. it is still necessary to hand peel the shell from these crustaceans, resulting in longer processing time and higher processing costs.

SUMMARY OF THE INVENTION

It is, therefore, an object of this invention to provide an apparatus for automatically peeling the hard shell from hard shelled crustaceans such as crayfish, lobster, rock shrimp, and other like crustaceans.

Accordingly, the blanched or partially cooked hard shelled crustaceans which have been de-headed may be peeled by an apparatus comprising of parallel cutting blades mounted to a drive means wherein the blades from cutting planes which are spaced apart a distance less than the body width of the hard shelled crustacean, and which comprises a guiding means which directs the crustaceans between the blades and into the cutting planes.

PREFERRED EMBODIMENTS OF THE INVENTION

Figure 1:
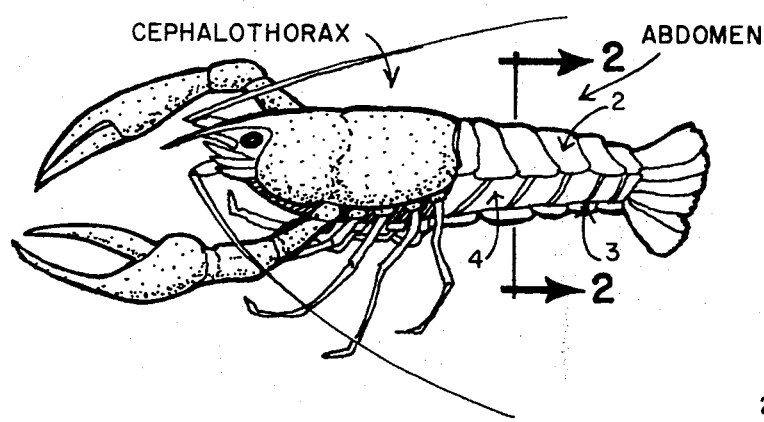
FIG. 1 is a perspective view of a crayfish.
Figure 2:
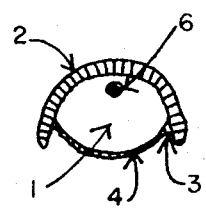
FIG. 2 is a cross-sectional view taken along lines 2—2 of FIG. 1.

While not intending to limit the scope of this invention, the preferred features are disclosed in conjunction with the processing of crayfish. As shown in FIGS. 1 and 2 the crayfish consists of two basic parts: the cephlathorax and the abdomen which contains the edible body meat 1. In addition to the body meat, the abdomen comprises an exoskeleton having a heavily calcified segmented dorsal shell 2 which is fused on to side sections 3 of the abdomen to a lesser calcified, thinner membrane-like ventral shell 4. Both the dorsal and the ventral shells join to the telson or tail section 5 of the abdomen. Finally, the gut or back vein 6 runs from the anus (not shown) located at the tail section 5 through the abdomen in the body mean 1 just below the middle of the dorsal shell 2 and into the cephlathorax.

In order to separate the edible body meat 1 from the rest of the crayfish it is necessary to first separate the cephlathorax from the abdomen, preferably after the crayfish has been slightly cooked or blanched. The blanching of the crayfish can be accomplished by simply submerging the crayfish in boiling water for a short period of time, generally two to five minutes. Care must be taken not to overcook the crayfish, as this can result in the body meat sticking to the dorsal and ventral shells which increases the difficulty of removing the meat from the shells without tearing the meat.

Once the cephlathorax has been removed from the abdomen it has been found that the body meat can be mechanically separated from the shells and tail section by passing the abdomen between parallel cutting blades which are spaced apart a distance equaling approximately the distance between the fusion section 3.

Figure 3:
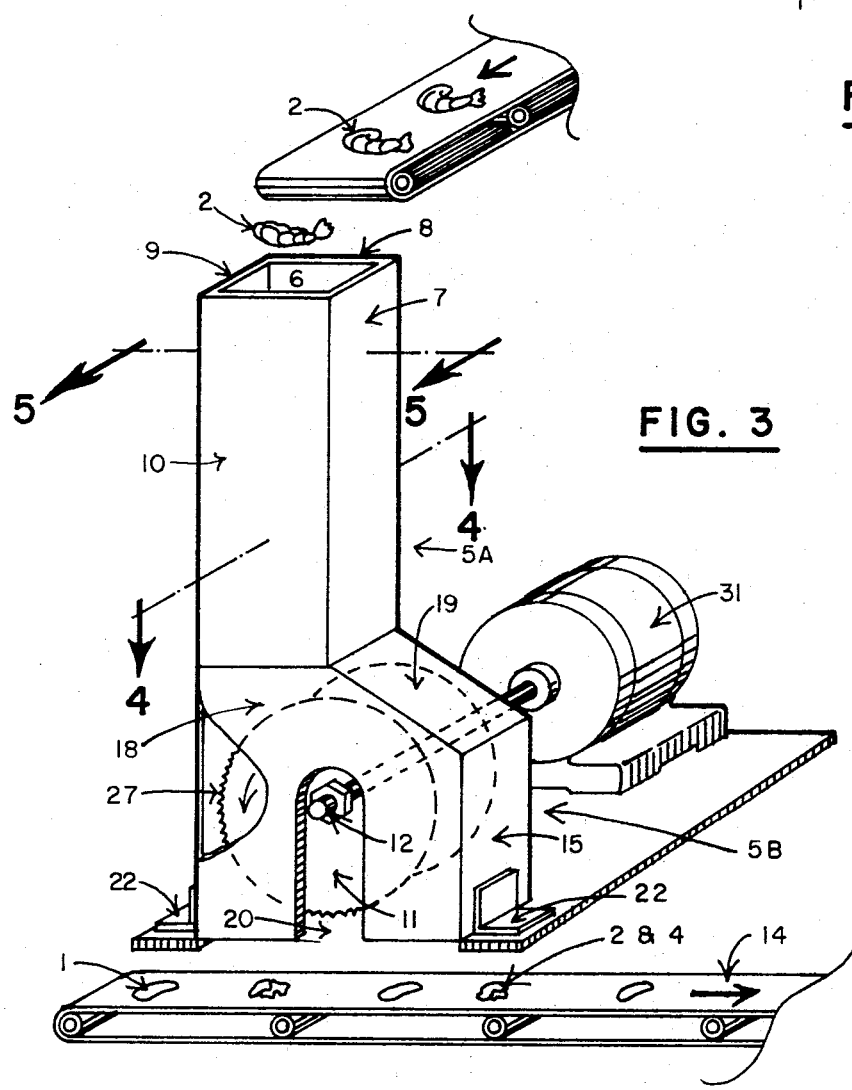
FIG. 3 is a cut-away perspective view illustrating one embodiment of the apparatus of this invention.

Turning to FIG. 3, a particularly preferred de-shelling apparatus is illustrated employing the above concept. Once the crayfish have been blanched and the cephlathorax removed the crayfish abdomen may be placed on any of the known conveyor belt systems 4 which will align the abdomens in a single file arrangement and bring them in a position to be dropped one at a time into guide channel 5. It is of course obvious that the crayfish abdomen sections could be hand dropped into guide channel 5 if one did not wish to employ a conveyor belt system.

Guide channel 5 comprises an aligning section 5A and a blade covering section 5B. The aligning section 5A comprises a hollow shaft 6 formed by flat rectangular-shaped walls 7, 8, 9 and 10 which is positioned over parallel cutting blades 11 which are mounted on axle 12 that extends through openings 13 located in the center of each blade 11 (see FIG. 8). Shaft 6 extends down and opens up over blades 11 whereby each crayfish abdomen will strike blade edges 14 which are located to the side of axle 12 to which axle 12 is turning. This prevents the abdomen from being kicked back out of the guide channel 5 by the revolving blades 11. The blade covering section 5B comprises flat rectangular-shaped walls 15, 16, 17 and 18 that fit about the sides, front and rear of blades 11, as shown, as well as a top panel 19 which extends above the top portion of blade edge 27 which is located to the side of axle 12 away from the direction that axle 12 is turning. Walls 16 and 18 are provided with indentation 20 through which axle 12 can extend and turn unimpeded. The entire guide channel 5 is then mounted on support structure 21 by means such as brackets 22 which can be bolted or welded to support structure 21.

In this particular embodiment of the invention it is important for efficient cutting of the crayfish shells that the dorsal shell 2 strike the cutting edges 27 of the blades first. It has been found that this can be accomplished by dropping the crayfish abdomen into the guide channel 5 a sufficient distance above the cutting edges of blades 11 to allow the abdomen to fall with its center of gravity at its most stable point. Since the center of gravity of the abdomen is closer to the center line of the dorsal shell than the center line of the ventral shell and since the most stable position is for the center of gravity to be closer to the ground, then the abdomen will hit the cutting edge dorsal shell first. The necessary distance which the abdomen must fall varies with the size, shape, weight, initial position of the abdomen, among other things. It has been found that a distance of three feet is generally sufficient for most crayfish abdomens.

When the dorsal shell first strikes the cutting edges of blades 11 it has been discovered that not only is the dorsal and ventral shell cut, but in most instances the brittle dorsal shell is shattered. This violent action on the shells results in the body meat being removed and separated from the shells. The centrifugal force put on the shells and the body meat causes them to be flung downward and out of the blades and, if desired, as shown in FIG. 1, into a conveyor belt system 23. Since the body meat is heavier than the shells it will generally be flung out of the blades a further distance down the conveyor belt which simplifies recovery of the body meat.

Another surprising aspect of this invention is that the body meat is very rarely cut by the blades as it passes through them. It is generally only when the crayfish have been overcooked or the crayfish is very old that any tearing or cutting of the body meat occurs.

Figure 4:
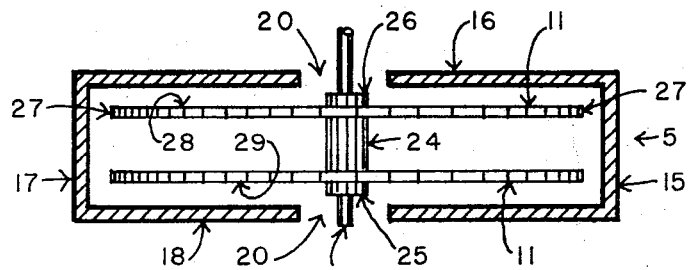
FIG. 4 is a cruss-sectional view taken along lines 4—4 of FIG. 3.
Figure 5:
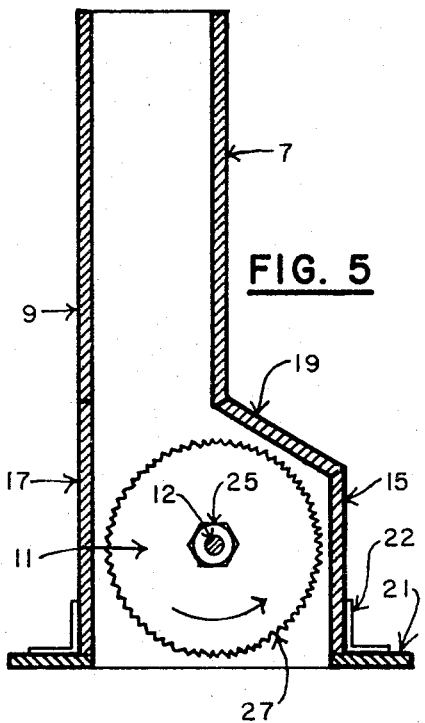
FIG. 5 is a cross-sectional view taken along lines 5—5 of FIG. 3.

Now in another preferred embodiment seen in FIGS. 4 and 5, blades 11 are secured in position within the guide channel 5 by interior locking spacer 24 and exterior locking spacers 25 and 26 which fit flush against blades 11 and are fixed in position to axle 11. The width of walls 15 and 17 is such that the distance from the edge 27 of blade 11 to the interior surfaces of walls 15 and 17 is less than the width of the abdomen. This insures that the crayfish abdomen will not merely be thrown around the blade without being cut by the blades. If the crayfish abdomen is thrown by the centrifugal force of the blades, it will strike either wall 15 or 17 and be forced back into cutting blades.

It is also preferred that the distance between the interior surfaces of walls 16 and 18 and blade sides 28 and 29, respectively, be less than the width of the crayfish abdomen. In this manner, the crayfish abdomen must pass between blades 11.

If desired, water can be passed over the cutting blades to keep them clean and free from shell fragments.

Figure 6:
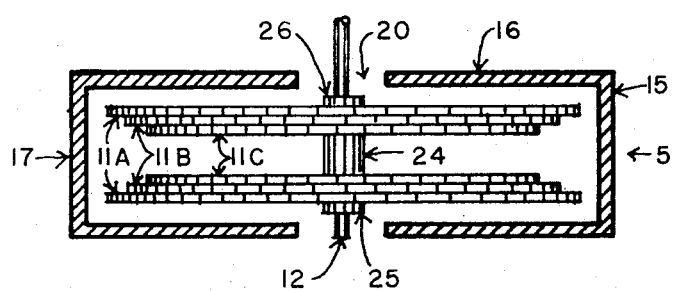
FIG. 6 is a cross-sectional view similar to FIG. 4 only modified to illustrate the use of multiple pairs of cutting blades.
Figure 7:
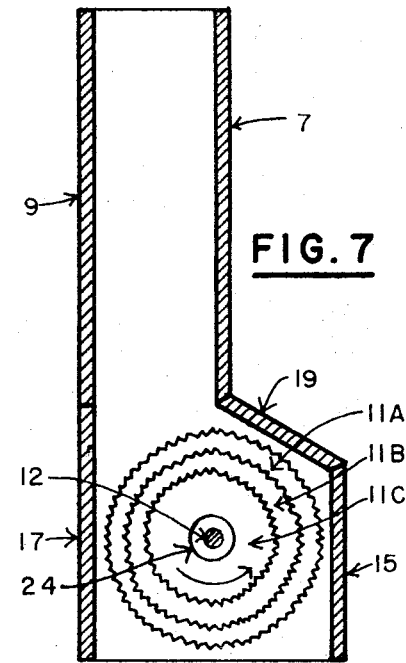
FIG. 7 is a cross-sectional view similar to FIG. 5 only modified to illustrate the use of multiple pairs of cutting blades.

In a specially preferred embodiment of this invention there will be multiple sets of parallel cutting blades arranged as shown in FIGS. 6 and 7. With this arrangement various sizes of crayfish abdomens can be handled with the same de-shelling apparatus without the necessity of altering the apparatus or pre-grading the crayfish abdomens as to size. More particularly, parallel blade sets 11A, 11B and 11C will be mounted on a common axle 11 attached to motor 31. The axle extends from the motor and through openings 30 (see FIG. 8) in the center of each cutting blade 11. The blades are arranged so that the blades extending farthest from axle 12 (in this case blades 11A) are mounted outside the other blades. This outside set of blades should be spaced apart a distance somewhat less than the widest crayfish abdomen to be processed. Each adjacent interior blade set will have its cutting edge 27 closer to axle 12 than the set immediately exterior to it. In the example shown, blades 11B will not extend out from axle 12 as far as blades 11A, and blades 11C likewise will not extend out from axle 12 as far as blades 11B. There can, of course, be as many sets of blades as desired. However, the interior blade set (e.g., blade set 11C) should be somewhat smaller than the width of the most narrow crayfish abdomen processed. By this arrangement, every crayfish abdomen must pass through and contact a parallel blade set.

Figure 8:
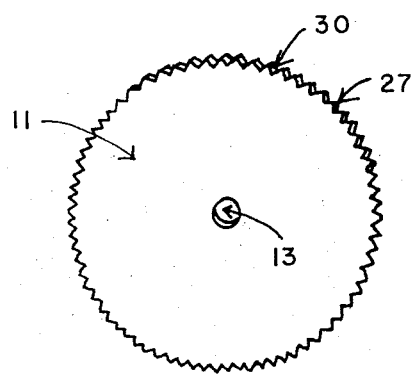
FIG. 8 is a perspective view of a cutting blade used in this invention.

It has also been found that better separation of the body meat from the shells is obtained with less tearing when the teeth 30 in the cutting edge 27 of blades 11 are narrowly spaced (See FIG. 8). It is also preferred that the blades not revolve too slow as this could result in tearing of the meat.

What I claim is:

1. A de-headed hard shelled crustacean de-shelling apparatus which comprises:
    a. concentric parallel cutting blades, having serrated edges, mounted to a drive means, said blades spaced apart a distance less than the width of said crustacean, and
    b. guiding means for guiding crustaceans, said guide means including a vertically extending hollow means for guiding crustaceans between cutting blades so as to permit crustaceans to fall by gravity to a position only between said spaced cutting blades.

2. An apparatus according to claim 1, further including a drive means for rotating the cutting blades, said drive means comprises a motor having an axle extending centrally through said blades perpendicular to planes formed by the blades, said blades being fixedly mounted on said axle.

3. A de-headed hard shelled crustacean de-shelling apparatus which comprises:
    a. parallel cutting blade means connected to a power source shaft for cutting crustaceans of varying sizes, said blade means including cutting assemblies that are spaced apart from each other, each said assembly including more than one cutting blade, each blade in each assembly being concentric with one another and said blades having cutting edges of unequal height from said power shaft wherein said heights of adjacent blades in one of said assemblies is such that said blade, further from said space between said assemblies has a cutting edge height from said power shaft greater than said adjacent blade.

* * * * *